(12) United States Patent
Lin

(10) Patent No.: US 11,902,138 B2
(45) Date of Patent: Feb. 13, 2024

(54) CONNECTION MAINTENANCE METHOD FOR INTERNET OF THINGS DEVICE

(71) Applicant: GETAC TECHNOLOGY CORPORATION, New Taipei (TW)

(72) Inventor: Shih-Tsan Lin, Taipei (TW)

(73) Assignee: GETAC TECHNOLOGY CORPORATION, Taiwan (CN)

( * ) Notice: Subject to any disclaimer, the term of this patent is extended or adjusted under 35 U.S.C. 154(b) by 0 days.

(21) Appl. No.: 17/585,440

(22) Filed: Jan. 26, 2022

(65) Prior Publication Data

US 2023/0239230 A1 Jul. 27, 2023

(51) Int. Cl.
*H04L 43/10* (2022.01)
*G16Y 40/10* (2020.01)
*G16Y 40/40* (2020.01)

(52) U.S. Cl.
CPC .......... *H04L 43/10* (2013.01); *G16Y 40/10* (2020.01); *G16Y 40/40* (2020.01)

(58) Field of Classification Search
None
See application file for complete search history.

(56) References Cited

U.S. PATENT DOCUMENTS

| | | | | |
|---|---|---|---|---|
| 2004/0044771 A1* | 3/2004 | Allred | ................. | H04L 41/0654 709/227 |
| 2009/0210485 A1* | 8/2009 | Dunk | .................... | H04L 67/14 709/224 |
| 2014/0003352 A1* | 1/2014 | Dai | ........................ | H04L 43/103 370/328 |
| 2014/0146795 A1* | 5/2014 | Tian | ....................... | H04W 68/00 370/336 |
| 2014/0221023 A1* | 8/2014 | Maggenti | .............. | H04W 68/02 455/458 |
| 2015/0282177 A1* | 10/2015 | Dong | .................... | H04L 67/145 370/329 |
| 2016/0080239 A1* | 3/2016 | Buenrostro | .......... | H04L 43/106 709/224 |
| 2017/0317910 A1* | 11/2017 | Deng | ...................... | H04L 43/10 |
| 2021/0081021 A1* | 3/2021 | Yu | ........................... | H04L 67/56 |

FOREIGN PATENT DOCUMENTS

CN 105578515 A * 5/2016
CN 107613525 B * 6/2021

* cited by examiner

*Primary Examiner* — Chris Parry
*Assistant Examiner* — Abderrahmen Chouat
(74) *Attorney, Agent, or Firm* — Han IP PLLC

(57) ABSTRACT

A connection maintenance method for an Internet of Things (IoT) device is disclosed in the present invention. The connection maintenance method includes establishing a virtual connection between the IoT device and a server, receiving a connection maintenance request from the IoT device, obtaining an identification code of the IoT device according to the connection maintenance request, transmitting a paging signal to the IoT device by using a first cycle according to the connection maintenance request to confirm whether the IoT device is alive, and when it is confirmed that the IoT device is alive, generating and transmitting a heartbeat packet carrying the identification code to the server by using a second cycle.

11 Claims, 5 Drawing Sheets

CONNECTION MAINTENANCE METHOD FOR INTERNET OF THINGS DEVICE

BACKGROUND OF THE INVENTION

Field of the Invention

The present invention relates to wireless communication technologies and, more particularly, to a connection maintenance method capable of reducing power consumption required for maintaining a connection between an Internet of Things (IoT) device and a server.

Description of the Prior Art

Accompanied with the rising demand for information transmission of the public, various wireless communication technologies, such as the Global System for Mobile communication (GSM) technology, Wideband Code Division Multiple Access (WCDMA) technology, Worldwide Interoperability for Microwave Access (WiMAX) technology, Long-Term Evolution (LTE) technology and LTE-Advanced technology have been developed and thrived as a result of such demand.

In the network architecture defined by the 3rd Generation Partnership Project (3GPP), an Internet of Things (IoT) device, after establishing a connection with a base station, needs to perform a paging procedure with the base station through an LTE channel so as to maintain normal operations of the connection. Furthermore, under common client-server architecture, if a server needs to monitor an IoT device, the server and the IoT device further need to confirm whether a virtual connection between the two is normal by a heartbeat mechanism.

In one implementation form of the heartbeat mechanism, an IoT device sends a heartbeat message to the server at a certain time interval, and the server performs monitoring accordingly. When no heartbeat message is received for a predetermined period of time, the server determines that the IoT device is no longer available, and automatically disconnects the virtual connection with the IoT device. However, power consumption of the IoT device may be considerably large due to a large amount of data of the heartbeat message transmitted by the IoT device each time.

SUMMARY OF THE INVENTION

In one embodiment, a connection maintenance method for an Internet of Things (IoT) device provided by the present invention includes establishing a virtual connection between the IoT device and a server, receiving a connection maintenance request from the IoT device, obtaining an identification code of the IoT device according to the connection maintenance request, transmitting a paging signal to the IoT device by using a first cycle according to the connection maintenance request to confirm whether the IoT device is still alive, and generating and transmitting a heartbeat packet carrying the identification code to the server by using a second cycle when it is confirmed that the IoT device is alive.

In one embodiment, a connection maintenance method for an IoT device provided by the present invention includes establishing a virtual connection with a server, transmitting a connection maintenance request to a base station after the virtual connection is established, receiving a confirmation signal corresponding to the connection maintenance request, and performing a paging procedure with the base station by using a first cycle after the confirmation signal is received, such that the base station generates and transmits a heartbeat packet carrying an identification code to the server by using a second cycle.

In conclusion, in the connection maintenance method for an IoT device according to the embodiments of the present invention, it is confirmed by using a base station whether the IoT device is alive, and a heartbeat packet carrying an identification code of the IoT device is generated and transmitted to a server by the base station when it is confirmed that the IoT device is alive, such that the server may maintain a virtual connection with the IoT device according to the heartbeat packet transmitted by the base station in substitution for the IoT device. Thus, the IoT device is not required to transmit a heartbeat packet, and power consumption thereof can be significantly reduced. Moreover, in the connection maintenance method for an IoT device according to the embodiments of the present invention, a cycle of a paging procedure between the server and the IoT device is increased to further reduce the power consumption of the IoT device.

Features and advantages of the present invention are described in detail in the embodiments below for a person skilled in the art to understand and accordingly implement the technical contents of the present invention. Moreover, on the basis of the disclosure of the description, claims and drawings of the present application, it would be easy for a person skilled in the art to understand the objects and advantages of the present invention.

DETAILED DESCRIPTION OF THE EMBODIMENTS

The above objects, features and advantages of the embodiments of the present invention will become more readily apparent in the detailed description given with the accompanying drawings below.

Figure 1:
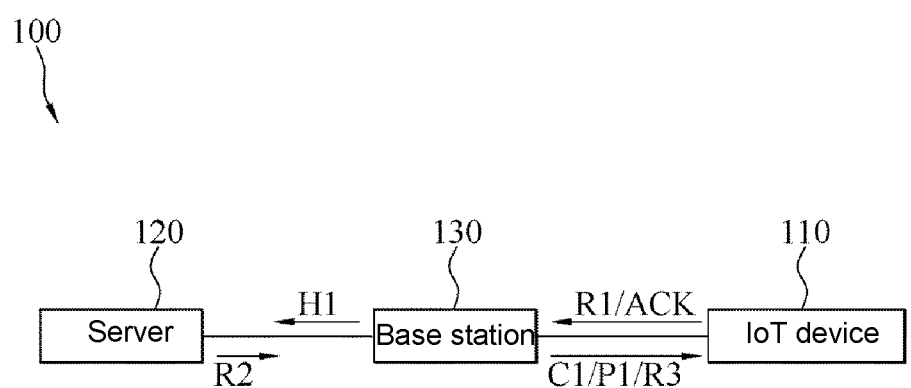
FIG. 1 is a block diagram of a wireless communication system according to an embodiment.

FIG. 1 shows a block diagram of a wireless communication system according to an embodiment. Referring to FIG. 1, a wireless communication system 100 may include an Internet of Things (IoT) device 110, a server 120 and a base station 130. For illustration purposes, one IoT device 110, one server 120 and one base station 130 are taken as an example; however, the numbers of the units above are not limited to the example above.

The base station 130 can wirelessly communicate with the IoT device 110 and the server 120. Herein, a virtual connection may be established between the IoT device 110 and the server 120 with the assistance of the base station 130, so as to perform wireless communication. The wireless communication may include, for example but not limited to, transmitting data collected by the IoT device 110 to the server 120 through the virtual connection.

In some implementation forms, the IoT device 110 may be a smartphone, a smart watch, a smart street light, a smart electricity meter, a network-connected blood glucose meter, or any other object with a network connection ability.

In some implementation forms, the IoT device 110, the server 120 and the base station 130 may support the Global System for Mobile Communication (GSM) technology, Personal Handphone System (PHS) technology, Code Division Multiple Access (CDMA) technology, Wideband Code Division Multiple Access (WCDMA) technology, Long-Term Evolution (LTE) technology, Worldwide Interoperability for Microwave Access (WiMAX) technology, Wireless Fidelity (Wi-Fi) technology, Bluetooth technology, and any combination thereof; however, the present invention is not limited to the examples above.

Figure 2:
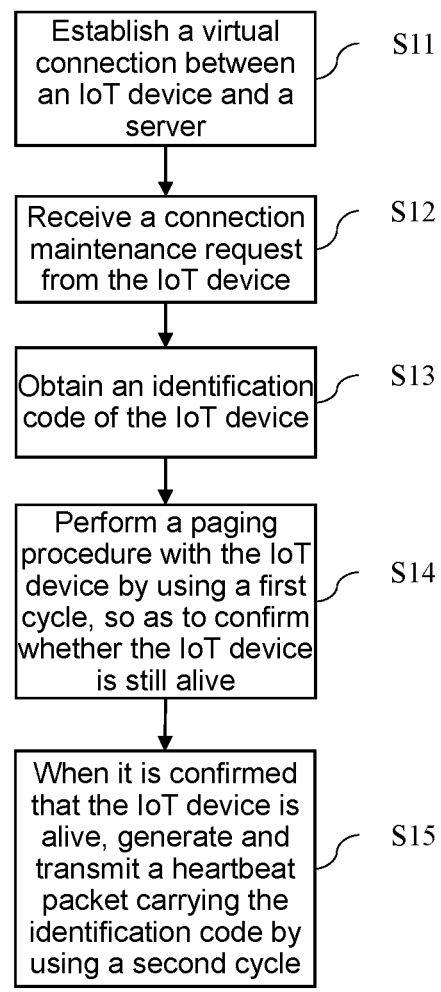
FIG. 2 is a flowchart of a connection maintenance method according to a first embodiment.

The wireless communication system 100 may perform the connection maintenance method of any embodiment of the present invention. FIG. 2 shows a flowchart of a connection maintenance method according to a first embodiment. Referring to FIG. 1 and FIG. 2, the connection maintenance method according to the first embodiment may be implemented by the base station 130 in the wireless communication system 100. In some embodiments, the connection maintenance method according to the first embodiment of the present invention may be implemented by a non-transient computer-readable recording medium in the base station 130. This non-transient computer-readable recording medium may store an agent, and the agent may perform the connection maintenance method according to the first embodiment of the present invention when the agent is loaded and executed by the base station 130.

In some embodiments, the non-transient computer-readable recording medium in the base station 130 may be an internal memory. In some implementation forms, the memory may be implemented by one or more storage elements, and each of these elements may be, for example but not limited to, a non-volatile memory such as a read-only memory (ROM) or a flash memory, or a volatile memory such as a random-access memory (RAM). In some other embodiments, the non-transient computer-readable recording medium may be a remote storage element, and transmission may be performed in a wired or wireless manner to the base station 130. In yet some other embodiments, the non-transient computer-readable recording medium may be an external storage element of the base station 130, and the base station 130 may connect to and access the storage element through a reader or a connector.

In the connection maintenance method according to the first embodiment, the base station 130 may assist in establishing a virtual connection between the IoT device 110 and the server 120 (step S11). The IoT device 110 and the server 120 may transmit data through this virtual connection. For example, the IoT device 110 may transmit data collected to the server 120 through the virtual connection.

After the virtual connection is established, the IoT device 110 of the wireless communication system 100 may send a connection maintenance request R1 to the base station 130, so as to request the base station 130 to assist in maintaining the virtual connection between the IoT device 110 and the server 120.

The base station 130 may obtain an identification code of the IoT device 110 according to the connection maintenance request R1 (step S13) after receiving the connection maintenance request R1 from the IoT device 110 (step S12). In some embodiments, the IoT device 110 may directly packetize the identification code in the connection maintenance request R1, so that the base station 130 can directly read the identification code of the IoT device 110 according to the connection maintenance request R1; however, the present invention is not limited to the example above.

In some implementation forms, the identification code may be a unique serial number set for the IoT device 110 at the time of being shipped out of the factory, and may be, for example but not limited to, an International Mobile Equipment Identity (IMEI). Moreover, the identification code may be stored in, for example but not limited to, a Subscriber Identity Module (SIM) card, a Universal Subscriber Identity Module (USIM) card, or a Removable User Identity Module (RUIM) card of the IoT device 110.

In addition to obtaining the identification code, the base station 130 may perform a paging procedure with the IoT device 110 by using a first cycle according to the connection maintenance request R1, so as to confirm whether the IoT device 110 is still alive (step S14).

In the paging procedure of step S14, the base station 130 may transmit a paging signal P1 to the IoT device 110 by using the first cycle. In some implementation forms, the IoT device 110 may be in a power-saving mode (PSM), and the IoT device 110 may monitor a paging channel (PCH) by using a first predetermined cycle. In each first predetermined cycle, the IoT device 110 may only perform the monitoring. However, after the first predetermined cycle has elapsed, the IoT device 110 still transmits an acknowledgement signal ACK to the base station 130 and restarts the first predetermined cycle. Thus, the base station 130 may confirm according to the acknowledgement signal ACK transmitted by the IoT device 110 whether the IoT device 110 is alive.

When it is confirmed that the IoT device 110 is alive, the base station 130 may generate and transmit a heartbeat packet H1 carrying the identification code of the IoT device 110 by using a second cycle to the server 120 (step S15). Herein, since the server 120 can receive the heartbeat packet H1 carrying the identification code of the IoT device 110 within a predetermined period of time, the server 120 may determine according to the heartbeat packet H1 from the base station 130 that the IoT device 110 is available, so as to further maintain the virtual connection with the IoT device 110 in response to the heartbeat packet H1.

Thus, in the connection maintenance method according to any embodiment of the present invention, the base station 130 transmits in substitution for the IoT device 110 the heartbeat packet H1 carrying the identification code of the IoT device 110 to the server 120, so that the IoT device 110 does not need to transmit the heartbeat packet H1 to thereby significantly reduce the power consumption of the IoT device 110.

In some embodiments, the first cycle may be different from the second cycle. In some implementation forms, the first cycle may be between 2 and 3 seconds, and the second cycle may be between 30 and 60 seconds. It should be noted that, these numerical values are examples for better understand the present invention rather than limitations to the present invention. A person having ordinary skill in the art should understand how to implement the present invention through modification and/or substitution.

Figure 3:
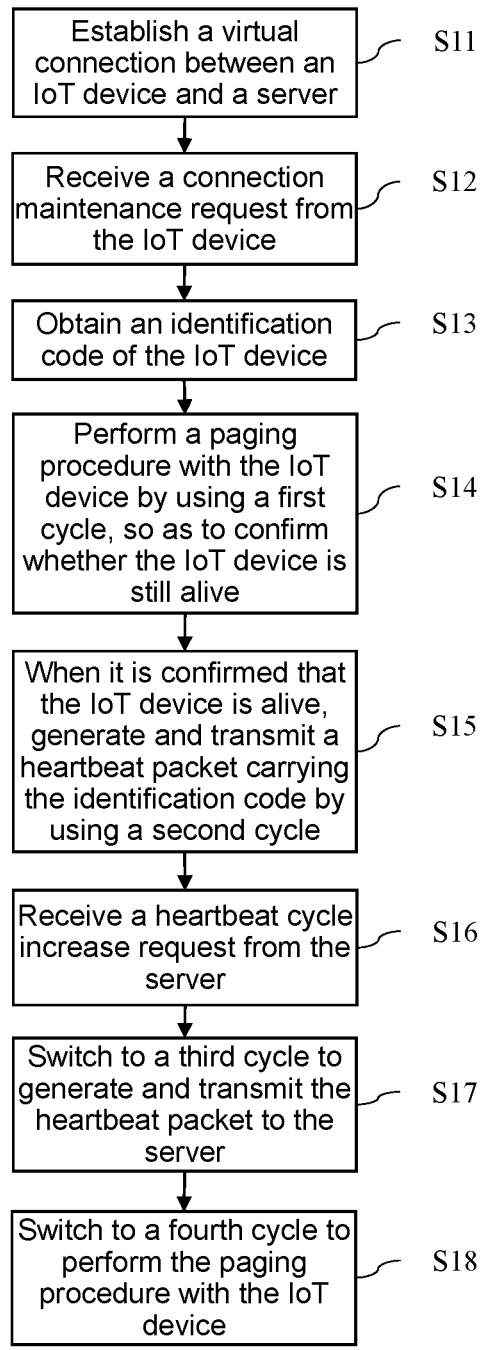
FIG. 3 is another flowchart of the connection maintenance method according to the first embodiment.

FIG. 3 shows another flowchart of the connection maintenance method according to the first embodiment. Referring to FIG. 1 and FIG. 3, in the connection maintenance method according to the first embodiment, the base station 130 may further receive a heartbeat cycle increase request R2 from the server 120 (step S16), and switch to a third cycle to generate and transmit the heartbeat packet H1 to the server 120 in response to the heartbeat cycle increase request R2 (step S17), wherein the third cycle is greater than the second cycle.

In some embodiments, the heartbeat cycle increase request R2 may be generated and transmitted to the base station 130 by the server 120 in the absence of any logged-in electronic devices. For example, within a predetermined period of time, if the server 120 discovers that no user has logged in the server 120 through an electronic device to perform related checking, it means that the server 120 is not required to immediately respond to any messages for the time being, and the server 120 at this point in time may generate and transmit the heartbeat cycle increase request R2 to the base station 130, so as to increase the cycle for generating and transmitting the heartbeat packet H1.

In the connection maintenance method according to the first embodiment, the base station 130 may switch to a fourth cycle to perform the paging procedure with the IoT device 110 in response to the heartbeat cycle increase request R2 after receiving the heartbeat cycle increase request R2 from the server 120 (step S18), wherein the fourth cycle is greater than the first cycle.

In the paging procedure in step S18, the base station 130 switches to the fourth cycle to transmit the paging signal P1 to the IoT device 110. Moreover, the IoT device 110 may switch to a second predetermined cycle to monitor the paging channel, wherein the second predetermined cycle is greater than the first predetermined cycle. In each second predetermined cycle, the IoT device 110 similarly may perform only the monitoring; however, after the second predetermined cycle has elapsed, the IoT device 110 still transmits the acknowledgement signal ACK to the base station 130 and restarts the second predetermined cycle.

As such, by increasing the cycle of the paging procedure (that is, the base station 130 switches to the fourth cycle to transmit the paging signal P1, and the IoT device 110 switches to the second predetermined cycle to monitor the paging channel), the power consumption of the IoT device 110 may be further reduced.

Figure 4:
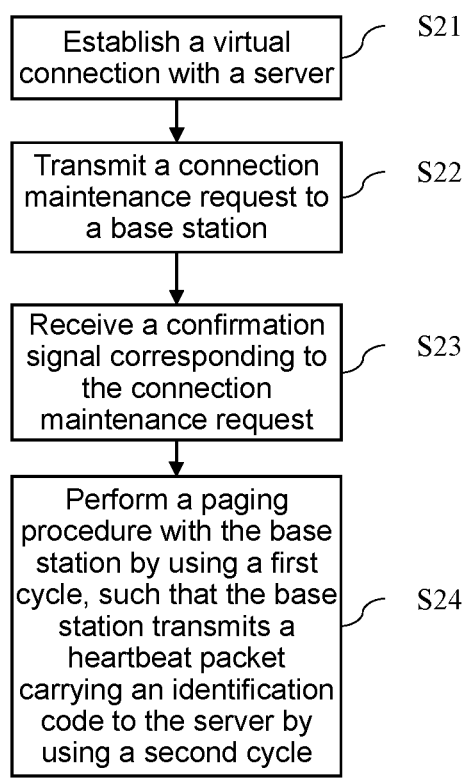
FIG. 4 is a flowchart of a connection maintenance method according to a second embodiment.

FIG. 4 shows a flowchart of a connection maintenance method according to a second embodiment. Referring to FIG. 1 and FIG. 4, the connection maintenance method according to the second embodiment may be performed by the IoT device 110 in the wireless communication system 100. In some embodiments, the connection maintenance method according to the second embodiment of the present invention may be implemented by a non-transient computer-readable recording medium in the IoT device 110. This non-transient computer-readable recording medium may store a program, and the program may perform the connection maintenance method according to the second embodiment of the present invention when the program is loaded and executed by the IoT device 110.

In some embodiments, the non-transient computer-readable recording medium in the IoT device 110 may be an internal memory. In some implementation forms, the memory may be implemented by one or more storage elements, and each of these elements may be, for example but not limited to, a non-volatile memory such as a read-only memory (ROM) or a flash memory, or a volatile memory such as a random-access memory (RAM). In some other embodiments, the non-transient computer-readable recording medium may be a remote storage element, and transmission may be performed in a wired or wireless manner to the IoT device 110. In yet some other embodiments, the non-transient computer-readable recording medium may be an external storage element of the IoT device 110, and the IoT device 110 may connect to and access the storage element through a reader or a connector.

In the connection maintenance method according to the second embodiment, the IoT device 110 may establish a virtual connection with the server 120 with the assistance of the base station 130 (step S21). Herein, the IoT device 110 and the server 120 may transmit data therebetween through the virtual connection.

After the virtual connection is established, the IoT device 110 may transmit a connection maintenance request R1 to the base station 130 to request the base station 130 to assist in maintaining the virtual connection between the IoT device 110 and the server 120 (step S22). In some embodiments, the connection maintenance request R1 may include an identification code of the IoT device 110. Please refer to the associated description of the first embodiment above for the implementation forms regarding the identification code of the IoT device 110, and so the related description is omitted herein for brevity.

The base station 130 may obtain the identification code of the IoT device 110 according to the connection maintenance request R1 after receiving the connection maintenance request R1, for example, reading the identification code of the IoT device 110 from the connection maintenance request R1. Moreover, the base station 130 may transmit a confirmation signal Cl to the IoT device 110 after receiving the connection maintenance request R1, so as to inform the IoT device 110 that the connection maintenance request R1 is received.

Thus, the IoT device 110 then receives the confirmation signal Cl corresponding to the connection maintenance request R1 (step S23) after transmitting the connection maintenance request R1 to the base station 130. After receiving the confirmation signal Cl, the IoT device 110 may perform the paging procedure with the base station 130 by using the first cycle, so that the base station 130 generates and transmits the heartbeat packet H1 carrying the identification code of the IoT device 110 to the server 120 by using the second cycle (step S24).

In one embodiment of the paging procedure in step S24, the base station 130 transmits the paging signal P1 to the IoT device 110 by using a first cycle. Herein, the IoT device 110 may be in a power-saving mode and monitor the paging channel by using a first predetermined cycle. In each first predetermined cycle, the IoT device 110 may perform only the monitoring; however, after the first predetermined cycle has elapsed, the IoT device 110 still transmits an acknowledgement signal ACK to the base station 130 and restarts the first predetermined cycle.

Thus, based on the acknowledgement signal ACK transmitted by the IoT device 110, the base station 130 may confirm according to the received acknowledgement signal ACK that the IoT device 110 is still alive, such that the base station 130 switches to a second cycle to generate and transmit the heartbeat packet H1 carrying the identification code of the IoT device 110 to the server 120. As such, the server 120 determines that the IoT device 110 is available because the heartbeat packet H1 carrying the identification code of the IoT device 110 is received within a predetermined period of time, and further maintains the virtual connection with the IoT device 110 in response to the heartbeat packet H1.

In the connection maintenance method of any embodiment of the present invention, since the IoT device 110 no longer needs to transmit the heartbeat packet H1 (which is transmitted by the base station 130 instead), the power consumption of the IoT device 110 may be significantly reduced.

Figure 5:
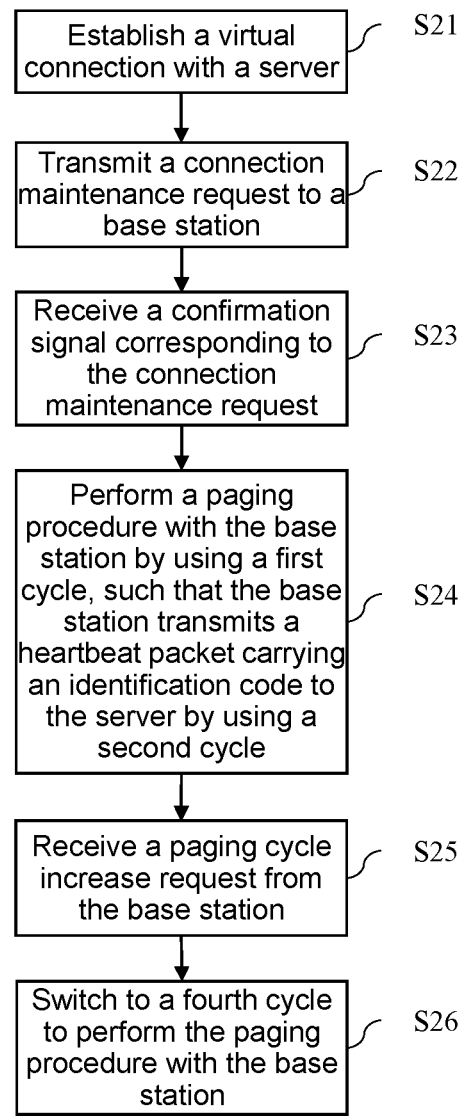
FIG. 5 is another flowchart of the connection maintenance method according to the second embodiment.

FIG. 5 shows another flowchart of the connection maintenance method according to the second embodiment. Referring to FIG. 1 and FIG. 5, in the connection maintenance method according to the second embodiment, the IoT device 110 may further receive a paging cycle increase request R3 form the base station 130 (step S25), and may switch to a fourth cycle to perform the paging procedure with the base station 130 in response to the paging cycle increase request R3 (step S26), wherein the fourth cycle is greater than the first cycle.

In one embodiment of step S25, the paging cycle increase request R3 is generated by the base station 130 in response to the heartbeat cycle increase request R2 from the server 120. In other words, the base station 130 may correspondingly generate and transmit the paging cycle increase request R3 to the IoT device 110 in response to the heartbeat cycle increase request R2 received. Thus, while the cycle for generating and transmitting the heartbeat packet H1 is increased, the cycle of the paging procedure between the base station 130 and the IoT device 110 is also increased, further reducing the power consumption of the IoT device 110.

Please refer to the associated description of the first embodiment for the implementation forms of the heartbeat cycle increase request R2, and so the related description is omitted herein for brevity.

In the paging procedure in step S26, the IoT device 110 may learn according to the paging cycle increase request R3 that the base station 130 may switch to the fourth cycle to transmit the paging signal P1 to the IoT device 110, and the IoT device 110 may switch to a second predetermined cycle to monitor the paging channel, wherein the second predetermined cycle is greater than the first predetermined cycle. In each second predetermined cycle, the IoT device 110 similarly may perform only the monitoring; however, after the second predetermined cycle has elapsed, the IoT device 110 still transmits the acknowledgement signal ACK to the base station 130 and restarts the second predetermined cycle.

By performing the connection maintenance method according to any embodiment of the present invention, the virtual connection between the IoT device 110 and the server 120 may be maintained in a connected state, while the power consumption of the IoT device 110 is significantly reduced. Moreover, because the virtual connection is persistently maintained in a connected state, communication and data transmission may be performed any time between the IoT device 110 and the server 120. For example, the server 120 may issue at all times an instruction to the IoT device 110 through the virtual connection (that is, the IoT device 110 may receive at all times an instruction from the server 120 through the virtual connection). Alternatively, the IoT device 110 may report at all times an event to the server 120 through the virtual connection (that is, the server 120 may receive at all times an event from the IoT device 110 through the virtual connection).

In some implementation forms, the event reported by the IoT device 110 may be, for example, that the IoT device 110 is online and is capable of performing real-time scenery capturing, or the IoT device 110 is online but is incapable of performing real-time scenery capturing; it should be noted that the present invention is not limited to the examples above.

In conclusion, in the connection maintenance method for an IoT device according to the embodiments of the present invention, it is confirmed by using a base station whether the IoT device is alive, and a heartbeat packet carrying an identification code of the IoT device is generated and transmitted to a server by the base station when it is confirmed that the IoT device is alive, such that the server may maintain a virtual connection with the IoT device according to the heartbeat packet transmitted by the base station in substitution for the IoT device. Thus, the IoT device is not required to transmit a heartbeat packet, and power consumption thereof can be significantly reduced. Moreover, in the connection maintenance method for an IoT device according to the embodiments of the present invention, a cycle of a paging procedure between the server and the IoT device is increased to further reduce the power consumption of the IoT device.

The technical contents of the present invention are disclosed by way of the preferred embodiments above, and it is to be noted that such description is not to be construed as limitations to the present invention. Without departing from the spirit of the present invention, all slight modifications and variations made by a person skilled in the art are encompassed within the scope of the present invention. Therefore, the scope of legal protection of the present invention shall be defined by the appended claims.

What is claimed is:

1. A connection maintenance method for an Internet of Things (IoT) device, comprising:
   establishing a virtual connection between the IoT device and a server;
   receiving, by a base station, a connection maintenance request from the IoT device;
   obtaining, by the base station, an identification code of the IoT device according to the connection maintenance request;
   transmitting, by the base station, a paging signal to the IoT device by using a first cycle according to the connection maintenance request, so as to confirm whether the IoT device is alive; and
   when it is confirmed that the IoT device is alive, generating and transmitting, by the base station in substitution for the IoT device, a heartbeat packet carrying the identification code of the IoT device to the server by using a second cycle.

2. The connection maintenance method for an IoT device of claim 1, wherein the server maintains the virtual connection in response to the heartbeat packet.

3. The connection maintenance method for an IoT device of claim 1, wherein the IoT device and the server transmit data through the virtual connection.

4. The connection maintenance method for an IoT device of claim 1, further comprising:
   receiving, by the base station, a heartbeat cycle increase request from the server;
   switching, by the base station, to a third cycle to generate and transmit the heartbeat packet to the server in response to the heartbeat cycle increase request, wherein the third cycle is greater than the second cycle; and
   switching, by the base station, to a fourth cycle to transmit the paging signal in response to the heartbeat cycle increase request, wherein the fourth cycle is greater than the first cycle.

5. The connection maintenance method for an IoT device of claim 4, wherein the heartbeat cycle increase request is generated and transmitted to the base station by the server in the absence of a logged-in electronic device.

6. A connection maintenance method for an Internet of Things (IoT) device, comprising:
- establishing a virtual connection with a server;
- transmitting a connection maintenance request to a base station after the virtual connection is established;
- receiving a confirmation signal corresponding to the connection maintenance request; and
- performing a paging procedure with the base station by using a first cycle after the confirmation signal is received, such that the base station generates and transmits, in substitution for the IoT device, a heartbeat packet carrying an identification code of the IoT device to the server by using a second cycle.

7. The connection maintenance method for an IoT device of claim 6, wherein the server maintains the virtual connection in response to the heartbeat packet.

8. The connection maintenance method for an IoT device of claim 6, further comprising:
- reporting an event to the server through the virtual connection.

9. The connection maintenance method for an IoT device of claim 6, further comprising:
- receiving an instruction from the server through the virtual connection.

10. The connection maintenance method for an IoT device of claim 6, further comprising:
- receiving a paging cycle increase request from the base station, wherein the paging cycle increase request is generated by the base station in response to a heartbeat cycle increase request from the server; and
- switching to a fourth cycle to perform the paging procedure with the base station in response to the paging cycle increase request, wherein the fourth cycle is greater than the first cycle.

11. The connection maintenance method for an IoT device of claim 10, wherein the base station further switches to a third cycle to generate and transmit the heartbeat packet to the server in response to the heartbeat cycle increase request.

\* \* \* \* \*

UNITED STATES PATENT AND TRADEMARK OFFICE
CERTIFICATE OF CORRECTION

PATENT NO.         : 11,902,138 B2
APPLICATION NO.    : 17/585440
DATED              : February 13, 2024
INVENTOR(S)        : Shih-Tsan Lin Page 1 of 1

It is certified that error appears in the above-identified patent and that said Letters Patent is hereby corrected as shown below:

On the Title Page

First Column, Item (73), the country of Assignee should be "Taiwan (TW)" instead of "Taiwan (CN)".

Signed and Sealed this
Twenty-third Day of April, 2024

Katherine Kelly Vidal
*Director of the United States Patent and Trademark Office*